July 20, 1943.  H. W. GREENUP  2,324,974
INNER TUBE AND METHOD OF PRODUCING THE SAME
Filed May 17, 1938
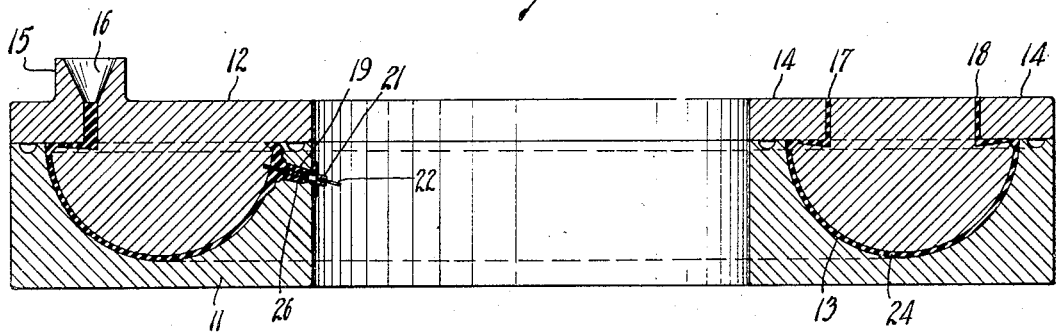
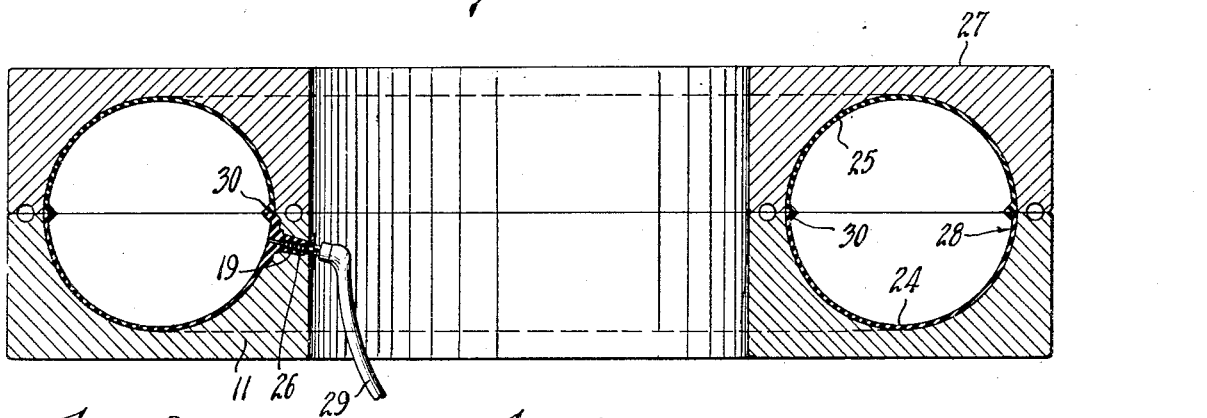
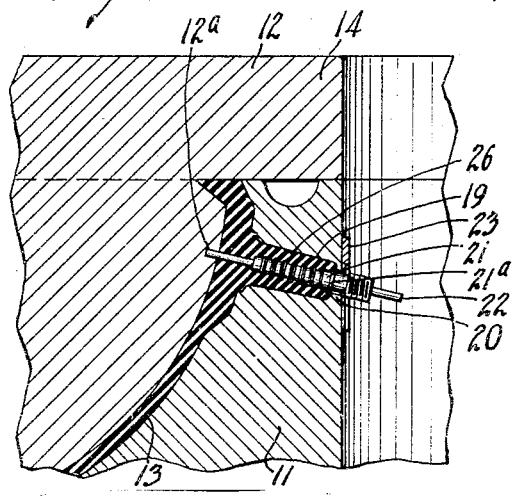
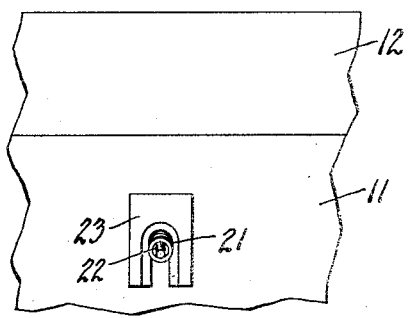
INVENTOR
HAROLD W. GREENUP
BY
ATTORNEYS Patented July 20, 1943

2,324,974

UNITED STATES PATENT OFFICE 2,324,974

INNER TUBE AND METHOD OF PRODUCING THE SAME

Harold W. Greenup, Akron, Ohio, assignor to The Firestone Tire & Rubber Company, Akron, Ohio, a corporation of Ohio Application May 17, 1938, Serial No. 208,429

5 Claims. (Cl. 18—58)

This invention relates to the production of hollow rubber articles, and particularly to the production of annular inner tubes directly from liquid latex.

Heretofore, numerous methods and types of apparatus have been used to form tubular, or spherical, articles directly from latex, deposition of latex by electricity being one such method. However, the electrical deposition of latex is relatively expensive and does not produce a greatly improved product. Dipping methods of forming hollow articles from latex have been objectionable owing to difficulty in removing the cores from the formed articles.

The chief object of this invention is to overcome the foregoing and other objections to known methods for producing hollow articles directly from latex, and to provide an uncomplicated method for forming hollow articles from latex, which method is practiced with a minimum labor cost.

Another object of the invention is to provide an improved inner tube for pneumatic tires which eliminates objections to known types of tubes and their production.

The foregoing and other objects are secured by producing a mold cavity of substantially half the form of the desired article and filling the cavity with liquid latex. Then heat is applied to the mold to coagulate the latex therein, whereupon two semi-article forms of the rubber coagulum may be placed together to form the desired hollow article with the mold positioned around the periphery of the hollow article and heat applied thereto to vulcanize the article after slight pressure is built up in the inside thereof, whereby the desired hollow article is formed.

In the accompanying drawing,

Figure 1 is a cross-sectional elevation through one embodiment of apparatus for practicing the invention;

Figure 2 is a cross-sectional elevation through apparatus for forming a hollow article in accordance with the invention;

Figure 3 is an enlarged cross-sectional elevation through the integral valve forming apparatus shown in Figure 1; and, Figure 4 is a detail view of the valve clamping means.

Heat-sensitized latex, such as is disclosed in Pestalozza Reissue Patent No. 18,437, is used in the practice of the instant invention.

Referring specifically to Figure 1, a mold member 11 is shown which is adapted to receive a core member 12 to form an annular, semi-tubular cavity 13 therebetween. The core 12 is provided with flanges 14 that bear upon the mold and form a tight connection therewith. A boss 15 extends upwardly from the core 12 and has a pouring sprue 16 formed therein which connects to the cavity 13 formed by the mold members, whereby liquid latex can be poured in the cavity. Diametrically opposite the pouring sprue 16, air vents 17 and 18 are formed in the core 12, each of which connects to one side of the semi-tubular cavity 13 to permit escapement of air from the cavity 13 when liquid is poured therein. A valve stem cavity 19 is formed in the inner surface of the mold 11 and it extends between the cavity 13 and the inner surface of the mold to provide a cavity for forming an integral valve stem on the tubular member formed in the mold.

Prior to pouring liquid latex into cavity 13, a valve body 21 is inserted into valve stem cavity 19. The valve body 21 is centered in cavity 19 and fixedly held therein by means of a cylindrical rod 22 which is inserted through the bore of the valve body 21; the inner end of the rod being inserted in a recess 12a in core 12 to align and hold the valve body firmly in position. A flange 21a on the valve body engages a shoulder 20 on the mold member to prevent the flow of latex beyond the valve stem cavity. Then by removing the rod 22 after the latex in the mold has coagulated, a hole remains which extends from the inner portion of the semi-tubular article completely through the integral valve stem. Valve body 21 and rod 22 are held in place by any suitable means, such as a clamping plate 23, as shown in Figures 3 and 4.

After the valve body and rod are inserted into the valve stem cavity 19, a liquid latex mixture, of any desired heat sensitized composition, may be poured through sprue 16 whereby it flows into cavity 13. By pouring a sufficient volume of the composition into the mold, the liquid gradually flows around the annular cavity and expels air therefrom through vents 17 and 18. Finally, the liquid will completely fill cavity 13 and be forced from vents 17 and 18, this indicating that the mold is full. Then the mold is heated in any suitable manner to coagulate the latex composition therein. It is essential that the latex coagulation be effected without any substantial vulcanization of the latex during this heating operation.

After the latex composition has been coagulated in the mold cavities, the core member 12 is removed from the mold member, preferably without disturbing the semi-tubular article 24 formed by the rubber coagulum. Then it usually is desirable to shear off the rubber that fills sprue 16 and vents 17 and 18. In view of the use of heat sensitized latex, core 12 may be omitted in the foregoing step, in which case mold member 11, either heated or cold, is completely filled with the latex compound and a film thereof coagulated locally on the surface of the mold by the residual heat in the mold or by externally applied heat. After a determinate period when the desired wall thickness is formed, the remaining liquid latex is dumped and the coagulated semi-article left in the mold for the succeeding steps which will next be described.

In order to form an annular tube from the coagulated latex, two semi-tubular, coagulated latex articles are combined and this is done by placing two molds together with the semi-articles therein as formed by either of the foregoing methods. As shown in Figure 2, the mold 11 is combined with a second mold 27, the molds carrying semi-tubular articles 24 and 25 respectively, which are formed therein, the molds forming an annular tubular cavity and the articles combining to form the desired tubular product. The unvulcanized rubber coagulum in molds 11 and 27 is quite adhesive when either wet or dry so that the semi-tubular articles readily unite to form the desired product, tube 28, and the invention contemplates coupling them in either condition, wet or dry. Since only one valve is required for each tubular article, the semi-tubular article 25 is not provided with a valve stem similar to valve stem 26 of article 24. Thus the mold in which it is produced is identical with that shown in Figure 1, except that it has no cavity therein equivalent to the valve stem cavity 19.

After the two semi-tubular portions are united, compressed air or steam is forced into the tube through a conduit 29 which connects to a suitable source of fluid pressure medium (not shown). After suitable pressure is built up in the tube 28, the molds 11 and 27 are heated to vulcanize the tube 28 with its integrally cast valve stem, after which the finished tube may be deflated and removed from the mold.

Figure 2 shows the normal cross section of the tube and it will be seen that annular, inner and outer circumferential portions 30 of the tube are appreciably thicker than the remaining wall portions. This construction results from making slight lips, or flanges, upon the edges of articles 24 and 25 to facilitate the coupling of the semi-tubular articles into an air-tight tube, whereby the completed tube, when vulcanized, actually is strongest at the junction between the two semi-tubular articles.

A further feature of the completed tube is that the valve stem is cast integrally with the remainder of the tube, which structure eliminates the provision of separate valve stems as is customary in the art.

From the foregoing description, it will be seen that the instant invention provides an easily practiced method for forming tubes directly from liquid latex. This method is uncomplicated and eliminates expensive processing operations required by prior methods of tube formation from milled rubber.

It should be observed that the articles 24 and 25 need not be of equal size as long as they permit withdrawal of the core used in producing them and combine to form the desired article.

The word latex in the specification is construed to mean any natural or artificial dispersion of rubber, although usually the invention is practiced with natural latex.

In accordance with the patent statutes, I have illustrated and described the principle and mode of operation of the preferred embodiments of the invention. However, it will be understood that various modifications can be made without departing from the scope of the invention as described in the appended claims.

What is claimed is:

1. An inner tube for pneumatic tires, said tube comprising annular wall portions that are cast from liquid rubber latex and a valve stem that is cast from liquid rubber latex integrally with a portion of the tube wall, the tube wall at the base of the valve stem being substantially thicker than the average thickness of the tube wall, and said tube having no joint between the valve stem and adjacent tube wall.

2. An inner tube for pneumatic tires, said tube comprising annular wall portions that are cast from liquid rubber latex and a valve stem that is cast from liquid rubber latex integrally with a portion of the tube wall, the tube wall at the base of the valve stem being substantially thicker than the average thickness of the tube wall, said tube having no joint between the valve stem and adjacent tube wall, and said tube having inner and outer circumferential wall portions appreciably thicker than the average thickness of the tube wall.

3. An inner tube for pneumatic tires, said tube comprising annular wall portions that are cast from liquid rubber latex and a valve stem that is cast from liquid rubber latex integrally with a portion of the tube wall, the tube wall at the base of the valve stem being substantially thicker than the average thickness of the tube wall, said tube having no joint between the valve stem and adjacent tube wall, and a metal valve tube embedded in and vulcanized to said valve stem.

4. A method of forming an inner tube including casting liquid latex into an annular, substantially semi-tubular form, coagulating the liquid latex while retaining it in such form, casting liquid latex into a complementary annular substantially semi-tubular form and simultaneously casting a latex rubber valve stem integrally therewith, adhering the two complementary semi-tubular forms of coagulated latex together to form an annular tube while enclosed in a mold, exerting pressure upon the inside surface of the tube within said mold, and heating the rubber to vulcanize it while retained in tubular form.

5. A method of forming an inner tube including casting a heat sensitized liquid latex composition into an annular, substantially semi-tubular form, coagulating the liquid latex while retaining it in such form, casting a heat sensitized liquid latex composition into a complementary annular substantially semi-tubular form and simultaneously casting a latex rubber valve stem integrally therewith, coagulating said complementary semi-tubular form and integral valve stem, adhering the two complementary semi-tubular forms of coagulated latex together to form an annular tube while enclosed in a mold, exerting pressure upon the inside surface of the tube within said mold, and heating the rubber to vulcanize it while retained in tubular form.

HAROLD W. GREENUP.